(12) United States Patent
Gowda

(10) Patent No.: US 12,466,414 B2
(45) Date of Patent: Nov. 11, 2025

(54) SYSTEMS AND METHODS OF ADJUSTING VEHICLE COMPONENTS FROM OUTSIDE OF A VEHICLE

(71) Applicant: Nissan North America, Inc., Franklin, TN (US)

(72) Inventor: Nikhil Gowda, San Francisco, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 530 days.

(21) Appl. No.: 17/390,783

(22) Filed: Jul. 30, 2021

(65) Prior Publication Data

US 2023/0029467 A1 Feb. 2, 2023

(51) Int. Cl.
| | |
|---|---|
| *B60W 50/00* | (2006.01) |
| *B60R 25/30* | (2013.01) |
| *B60R 25/31* | (2013.01) |
| *G06F 3/16* | (2006.01) |
| *G07C 9/00* | (2020.01) |

(52) U.S. Cl.
CPC ....... *B60W 50/0098* (2013.01); *B60R 25/305* (2013.01); *B60R 25/31* (2013.01); *G06F 3/167* (2013.01); *G07C 9/00309* (2013.01); *B60W 2050/0083* (2013.01); *B60W 2540/21* (2020.02); *G07C 2009/00984* (2013.01); *G07C 2209/64* (2013.01)

(58) Field of Classification Search
CPC ..... B60W 50/0098; B60W 2050/0083; B60W 2540/21; B60W 2050/0064; B60W 50/14; B60W 2540/043; B60W 2540/223; B60R 25/305; B60R 25/31; B60R 16/037; G06F 3/167; G07C 9/00309; G07C 2009/00984; G07C 2209/64; G07C 2209/63

USPC .......................................................... 701/36
See application file for complete search history.

(56) References Cited

U.S. PATENT DOCUMENTS

| | | | | |
|---|---|---|---|---|
| 2014/0303983 | A1* | 10/2014 | Bapat ...................... | G10L 15/20 |
| | | | | 704/273 |
| 2015/0120151 | A1* | 4/2015 | Akay ...................... | B60R 25/01 |
| | | | | 701/1 |
| 2018/0007060 | A1* | 1/2018 | Leblang ................ | H04L 63/107 |

(Continued)

OTHER PUBLICATIONS

Techhive, How to make Alexa and Google Assistant let you know when they start-and stop-listening, Mar. 6, 2020 (Year: 2020).*

*Primary Examiner* — Abby J Flynn
*Assistant Examiner* — Sean Patrick Reidy
(74) *Attorney, Agent, or Firm* — Global IP Counselors, LLP

(57) ABSTRACT

Systems and methods for adjusting one or more component of a vehicle are disclosed herein. In an embodiment, a system for adjusting one or more component of a vehicle includes at least one adjustable vehicle component, an authentication device, an audio device, and a controller. The authentication device is configured to detect a vehicle user outside of the vehicle and generate corresponding authentication data. The audio device is configured to receive an audible command from the vehicle user from outside of the vehicle and generate corresponding command data. The controller is programmed to cause an adjustment of the at least one adjustable vehicle component based on the command data when the vehicle user has been authenticated based on the authentication data.

20 Claims, 3 Drawing Sheets

(56) References Cited

U.S. PATENT DOCUMENTS

2018/0251122 A1\* 9/2018 Golston ................ B60W 40/08
2021/0001810 A1\* 1/2021 Rivard ................. G06V 40/172

\* cited by examiner

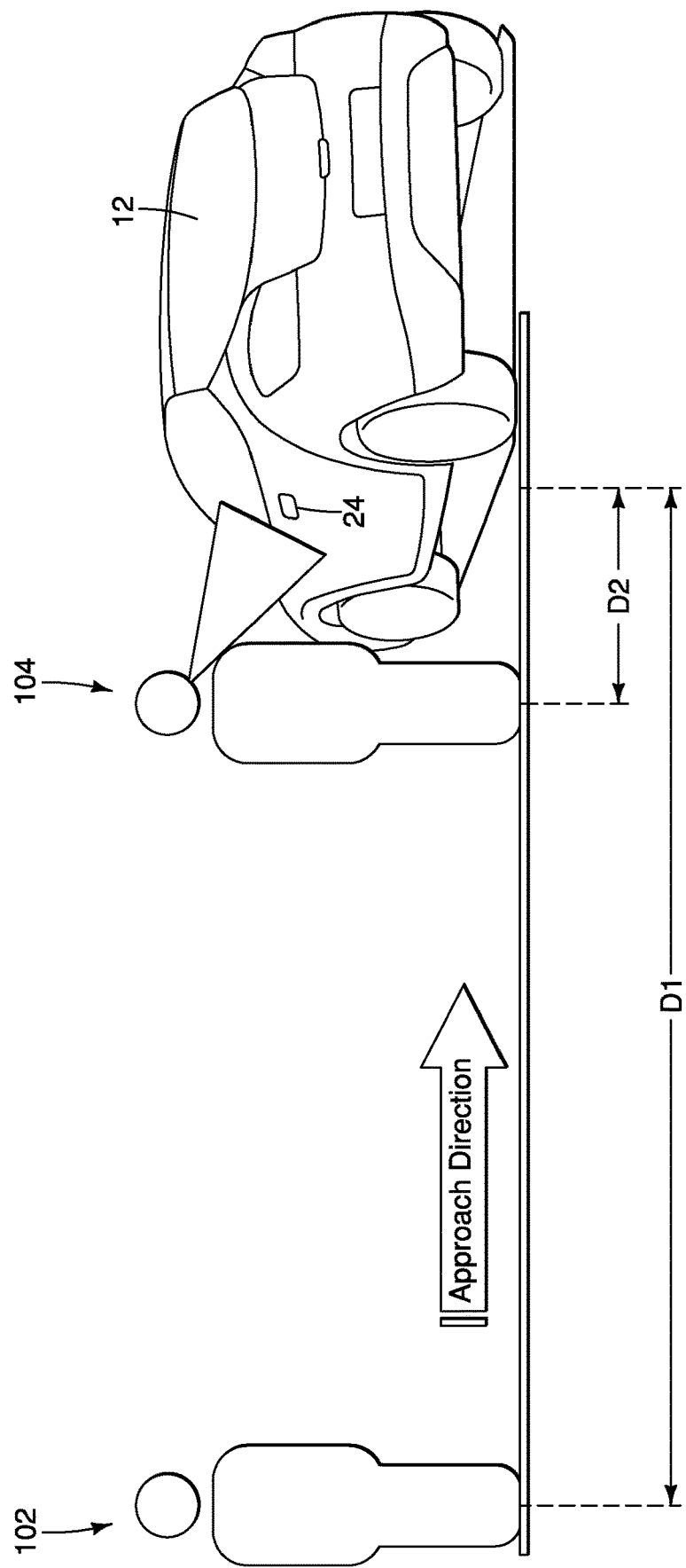

SYSTEMS AND METHODS OF ADJUSTING VEHICLE COMPONENTS FROM OUTSIDE OF A VEHICLE

BACKGROUND

Technical Field

The present disclosure generally relates to systems and methods of adjusting vehicle components. More specifically, the present disclosure relates to systems and methods of adjusting vehicle components from outside of a vehicle.

Background Information

Some vehicle components are difficult or uncomfortable to adjust once an occupant is already inside the vehicle. For example, tall individuals have expressed discomfort in making seat adjustments after ingress. Child seats can also be difficult to adjust from inside a vehicle. Other vehicle components such as climate control systems are preferable to set for a period of time before entering a vehicle.

SUMMARY

It has been discovered it is advantageous to enable vehicle users to make adjustments to various vehicle components before entering a vehicle. The present disclosure provides systems and methods which are configured to authorize a potential user of a vehicle and then allow the authorized user to make adjustments to vehicle components within the vehicle before entering the vehicle. The systems and methods of the present disclosure further allow the adjustments to be made by an audible command from outside of the vehicle. This feature is advantageous, for example, when a vehicle user has his or her hands full and cannot easily access a lock or open a door.

In view of the state of the known technology, one aspect of the present disclosure is to provide a system for adjusting one or more component of a vehicle. The system includes at least one adjustable vehicle component, an authentication device, an audio device, and a controller. The authentication device is configured to detect a vehicle user outside of the vehicle and generate corresponding authentication data. The audio device is configured to receive an audible command from the vehicle user from outside of the vehicle and generate corresponding command data. The controller is programmed to cause an adjustment of the at least one adjustable vehicle component based on the command data when the vehicle user has been authenticated based on the authentication data.

A second aspect of the present disclosure is to provide a method of adjusting one or more component of a vehicle. The method includes detecting a potential vehicle user located outside of the vehicle, authenticating the potential vehicle user as an authorized vehicle user, activating an audio device for reception of an audible command from the authorized vehicle user, receiving the audible command from the authorized vehicle user while the authorized vehicle user is located outside of the vehicle, and adjusting at least one adjustable vehicle component in response to the audible command.

A third aspect of the present disclosure is to provide a method of adjusting one or more component of a vehicle. The method includes recording at least one image of a potential vehicle user located outside of the vehicle, authenticating the potential vehicle user as an authorized vehicle user, and adjusting at least one adjustable vehicle component based on the at least one image upon authenticating the authorized vehicle user.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure:

FIG. 3 illustrates an example embodiment of the method of FIG. 2.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
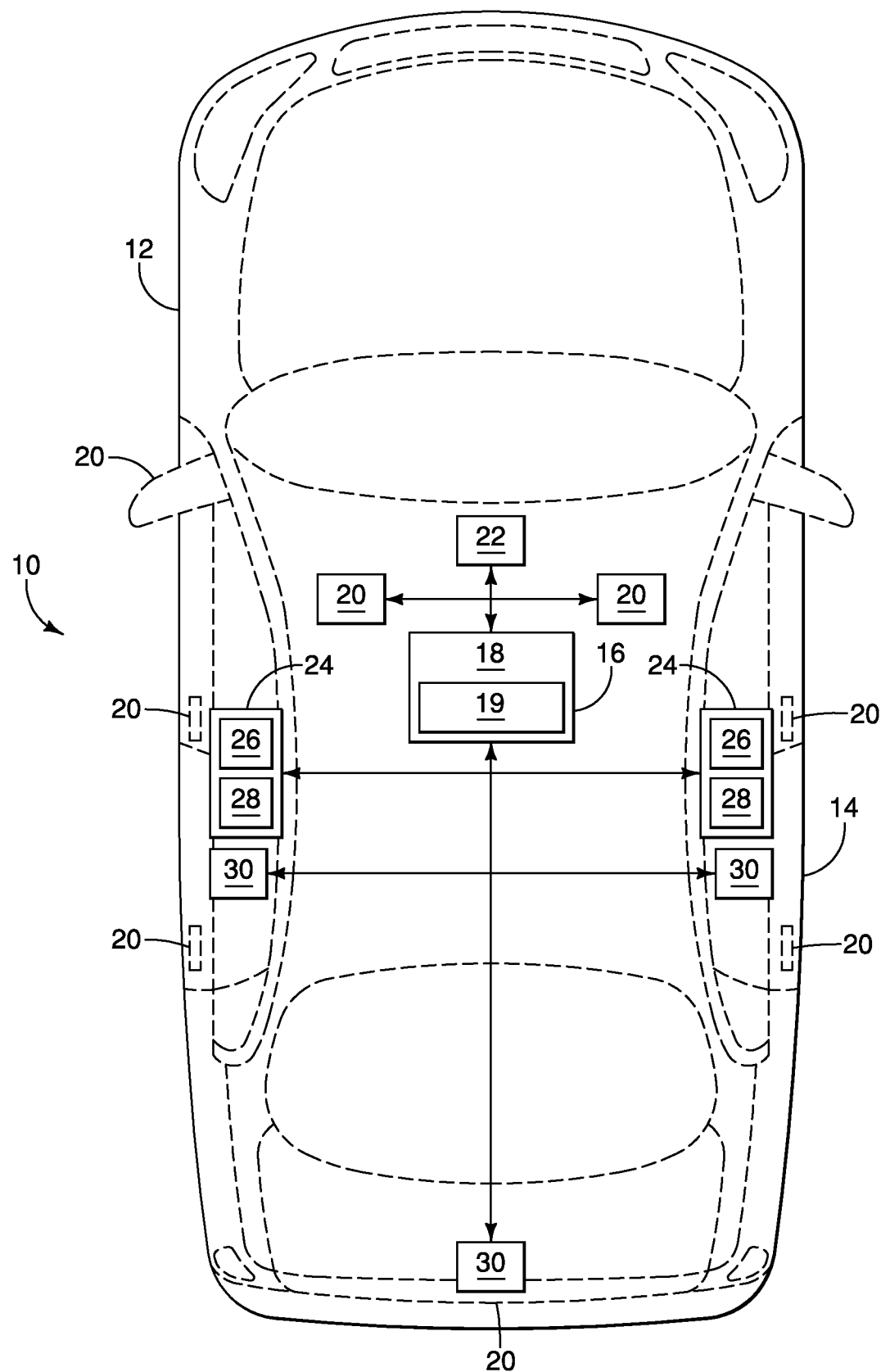
FIG. 1 illustrates a schematic diagram of an example embodiment of a system for adjusting one or more component of a vehicle in accordance with the present disclosure.

Referring initially to FIG. 1, a system 10 for adjusting one or more component of a vehicle 12 is illustrated in accordance with a first embodiment. In the illustrated embodiment, the system 10 includes a vehicle 12 having a vehicle body 14 and a controller 16. Alternatively, the system 10 can include the controller 16 and/or other components discussed herein and be separate from and in communication with one or more components of the vehicle 12.

In an embodiment, the controller 16 includes at least one processor 18 and at least one memory 19. The controller 16 preferably includes a microcomputer with a vehicle component control program that controls a plurality of adjustable vehicle components 20 as discussed below. The controller 16 can also include other conventional components such as an input interface circuit, an output interface circuit, and storage devices such as a ROM (Read Only Memory) device and a RAM (Random Access Memory) device. The microcomputer of the controller 16 is programmed to control one or more vehicle component 20, authentication device 22, audio device 24 and/or sensor 30 discussed herein. The memory circuit stores processing results and control programs such as ones for vehicle component control operations that are run by the processor circuit. The controller 16 is operatively coupled to the vehicle body 14 in a conventional manner. The internal RAM of the controller 16 stores statuses of operational flags and various control data. The internal ROM of the controller 16 stores the instructions for various operations. The controller 16 is capable of selectively controlling any of the components of the vehicle 12 in accordance with the control program. In an embodiment, the controller 16 includes a voice AI system or a voice recognition system.

The vehicle 12 includes at least one adjustable vehicle component 20. The at least one adjustable vehicle component 20 can include any vehicle component that is capable of being adjusted based on instructions from the controller 16. The adjustment can include at least one of a mechanical adjustment, a volume level adjustment, a temperature adjustment, a route adjustment, a mode adjustment, or any other adjustment caused by instructions generated by the controller 16. The adjustment can be to change at least one adjustable vehicle component 20 from a current configuration to a new configuration. The new configuration can be a preset configuration. The controller 16 is configured to cause the adjustment of the at least one adjustable vehicle component 20 by directly controlling the at least one adjustable vehicle component 20 according to the instructions and/or by sending the instructions to a separate controller of the at least one adjustable vehicle component 20. As discussed in more detail below, the controller 16 is programmed to cause the adjustment of at least one adjustable vehicle component 20 based on command data when the vehicle user has been authenticated based on authentication data.

In an embodiment, the vehicle 12 includes a plurality of adjustable vehicle components 20. In an embodiment, each of the plurality of adjustable vehicle components 20 are configured to be adjusted in response to at least one audible command. As explained in more detail below, the controller 16 is programmed to correlate command data with an adjustable vehicle component 20 of a plurality of adjustable vehicle components 20 and cause the proper adjustment to the correlated adjustable vehicle component 20.

In an embodiment, the at least one adjustable vehicle component 20 includes a vehicle seat. The vehicle seat can be a driver's seat or passenger's seat within the vehicle 12. The adjustment can be a mechanical adjustment of the seat position. The mechanical adjustment can be to change the vehicle seat to a different configuration. The different configuration can be a preset configuration. The controller 16 is configured to cause the adjustment by causing the vehicle seat to move from a current configuration to the different configuration. The adjustment can also be a temperature adjustment of the vehicle seat. The temperature adjustment can be to control a seat heater to raise or lower a temperature of the vehicle seat. In an embodiment, the adjustment can both change the physical orientation of the vehicle seat and change the temperature of the vehicle seat. Those of ordinary skill in the art will recognize from this disclosure that there are various ways to adjust a vehicle seat in accordance with the methods discussed herein.

In an embodiment, the at least one adjustable vehicle component 20 includes a lock. For example, the lock can be a door lock or a trunk lock. The lock can also relate to another vehicle component, for example, a steering wheel lock, a child-safety lock, a user interface lock, or another lock within the vehicle 12. The adjustment can be a mechanical or computer adjustment of the lock. The adjustment can be to lock or unlock the lock. Those of ordinary skill in the art will recognize from this disclosure that there are various ways to adjust a lock in accordance with the methods discussed herein.

In an embodiment, the at least one adjustable vehicle component 20 includes a climate control system within the vehicle 12. The climate control system can include, for example, an in-vehicle heating or cooling unit, a seat heater, or another type of heating or cooling device. The adjustment can be a temperature adjustment of the climate control system. The temperature adjustment can be to turn the climate control system on or off. The temperature adjustment can be to raise or lower a temperature. The temperature adjustment can be to raise or lower a temperature to a predetermined temperature. The adjustment can also be a mechanical adjustment. The mechanical adjustment can be, for example, to adjust a fan or other mechanical element of the climate control system. Those of ordinary skill in the art will recognize from this disclosure that there are various ways to adjust a climate control system in accordance with the methods discussed herein.

In an embodiment, the at least one adjustable vehicle component 20 includes a vehicle component with one or more predetermined settings. The adjustment can be to change from a current configuration to a predetermined configuration. The adjustment can be to change from one of a plurality of predetermined settings to another of the plurality of predetermined settings.

The vehicle 12 includes an authentication device 22. The authentication device 22 is configured to detect a vehicle user outside of the vehicle and generate corresponding authentication data. The authentication device 22 can include a sensor configured to detect an object held by the vehicle user within an authentication distance of the vehicle. For example, the authentication device 22 can include a proximity sensor. In an embodiment, the authentication device 22 includes a sensor configured to detect a key fob located within an authentication distance of the vehicle 12. For example, the sensor can be configured to detect a signal emitted by a key fob as known in the art. The authentication device 22 can also include a camera or other image recording device configured to record at least one image of a potential vehicle user.

In an embodiment, the authentication data generated by the authentication device 22 includes data related to a signal detected from an object held by the user, for example, from a key fob. In an embodiment, the authentication data needed to authorize a vehicle user is specific to the vehicle user. Thus, each vehicle user or authentication object (e.g., key fob) causes the authentication device 22 to generate distinct authentication data which can be used to identify and/or authenticate the vehicle user. In an embodiment, the authentication data includes data from an image taken of a potential vehicle user which can then be used to authenticate the user.

The vehicle 12 includes an audio device 24. The audio device 24 is configured to receive an audible command from a vehicle user from outside of the vehicle 12. In the illustrated embodiment, the audio device 24 is located on an exterior of the vehicle 12 so as to receive the audible command while the vehicle user is located outside of the vehicle 12. In an embodiment, the audio device is located in the B pillar of the vehicle 12. Alternatively, the audio device 24 can be located inside the vehicle but be configured to pick up noise outside of the vehicle 12. In an embodiment, the audio device 24 can also serve other functions for the vehicle 12, for example, be used by a navigation system, an in-vehicle entertainment unit, or another vehicle component. In an embodiment, the vehicle 12 includes multiple audio devices 24. The audio device 24 can also be a vehicle component 20 which is controlled by the controller 16 in accordance with the present disclosure. For example, in an embodiment, the controller 16 is configured to adjust a volume of the audio device 24 in response to an audible command received in accordance with the present disclosure.

The audio device 24 includes a microphone 26. The microphone 26 is configured to receive the audible command from the vehicle user located outside the vehicle 12. In an embodiment, the audio device 24 also includes a speaker 28 configured to provide an audible response to the vehicle user while the vehicle user is located outside the vehicle 12. In an embodiment, the microphone 26 and the speaker 28 are located together on the same unit. Alternatively, the microphone 26 and speaker 28 can be located separately. In an embodiment, the audio device 24 can include multiple microphones 26 and/or multiple speakers 28 located at different locations of the vehicle 12.

The controller 16 is configured to activate and deactivate the audio device 24. In an embodiment, the audio device 24 outputs a first noise (e.g., a chime) when activated and outputs a second noise (e.g., a chime) when deactivated. The first noise can be different from the second noise. Alternatively, the first noise can be the same as the second noise. In an embodiment, the controller 16 is programmed to activate the audio device 24 for reception of an audible command upon authenticating the vehicle user based on authentication data. In an embodiment, the controller 16 is programmed to deactivate the audio device 24 after causing an adjustment to at least one adjustable vehicle component 20.

The audio device 24 is configured to generate command data based on an audible command. In an embodiment, the command data represents the audible command received by the audio device 24. In an embodiment, each audible command received by the audio device 24 results in the generation of distinct command data. In an embodiment, the command data includes an automatic speech recognition (ASR) output and/or a natural language understanding (NLU) output and/or is used to generate an ASR output and/or an NLU output.

The vehicle 12 includes at least one sensor 30. The at least one sensor 30 is configured to generate sensor data. In an embodiment, the authentication device 22 includes or is operatively connected to at least one sensor 30. In an embodiment, the authentication device 22 is configured to use sensor data from at least one sensor 30 during the authentication process, as described in more detail below.

In the illustrated embodiment, one or more sensor 30 is located on an external portion of the vehicle body 14. A sensor 30 can also be located internally within the vehicle body 14 and focused externally through a component of the vehicle body 14. A sensor 30 can also include multiple sensors 30 located at different locations around the vehicle body 14 and/or positioned to detect vehicle users at various respective positions in relation to the vehicle body 14.

In an embodiment, the at least one sensor 30 includes at least one proximity sensor. In an embodiment, at least one sensor 30 is configured to determine a position of a vehicle user with respect to the vehicle 12. For example, at least one sensor 30 is configured to determine the relative distance between the vehicle 12 and a vehicle user. Alternatively or additionally, at least one sensor 30 is configured to determine where the vehicle user is located with respect to the vehicle 12 (e.g., a relative position). For example, in an embodiment, the controller 16 is configured to use sensor data from a sensor 30 to determine a vehicle door located closest to the vehicle user. In another example embodiment, the controller 16 is configured to determine whether the user is located at the rear of the vehicle near the trunk based on sensor data from a sensor 30. In an embodiment, a sensor 30 is configured to determine whether the vehicle user is located on a front, rear, right side, or left side of the vehicle. In an embodiment, a sensor 30 can include a LIDAR sensor which determines distance by targeting the vehicle user with a laser and measuring the time for the reflected light to return to a receiver. In various embodiments, a sensor 30 can use light, radar, ultrasonic or other technologies to determine the distance and or relative position between a vehicle user and the vehicle 12. In various embodiments, a sensor 30 can use Bluetooth technology, wife technology, near field technology, far field technology, camera-based technology, LIDAR-based technology, RADAR-based technology, ultra wide band RADAR based technology, or another technology.

In an embodiment, at least one sensor 30 includes at least one image sensor. In an embodiment, the image sensor is configured to record one or more image of a vehicle user. In an embodiment, the image sensor includes a camera configured to record one or more image of a vehicle user while the vehicle user is outside of the vehicle. In an embodiment, the image sensor includes a camera that is configured to record one or more image of a vehicle user while the vehicle user is outside of the vehicle but within an authentication distance of the vehicle 12. An image can include still images or video.

Figure 2:
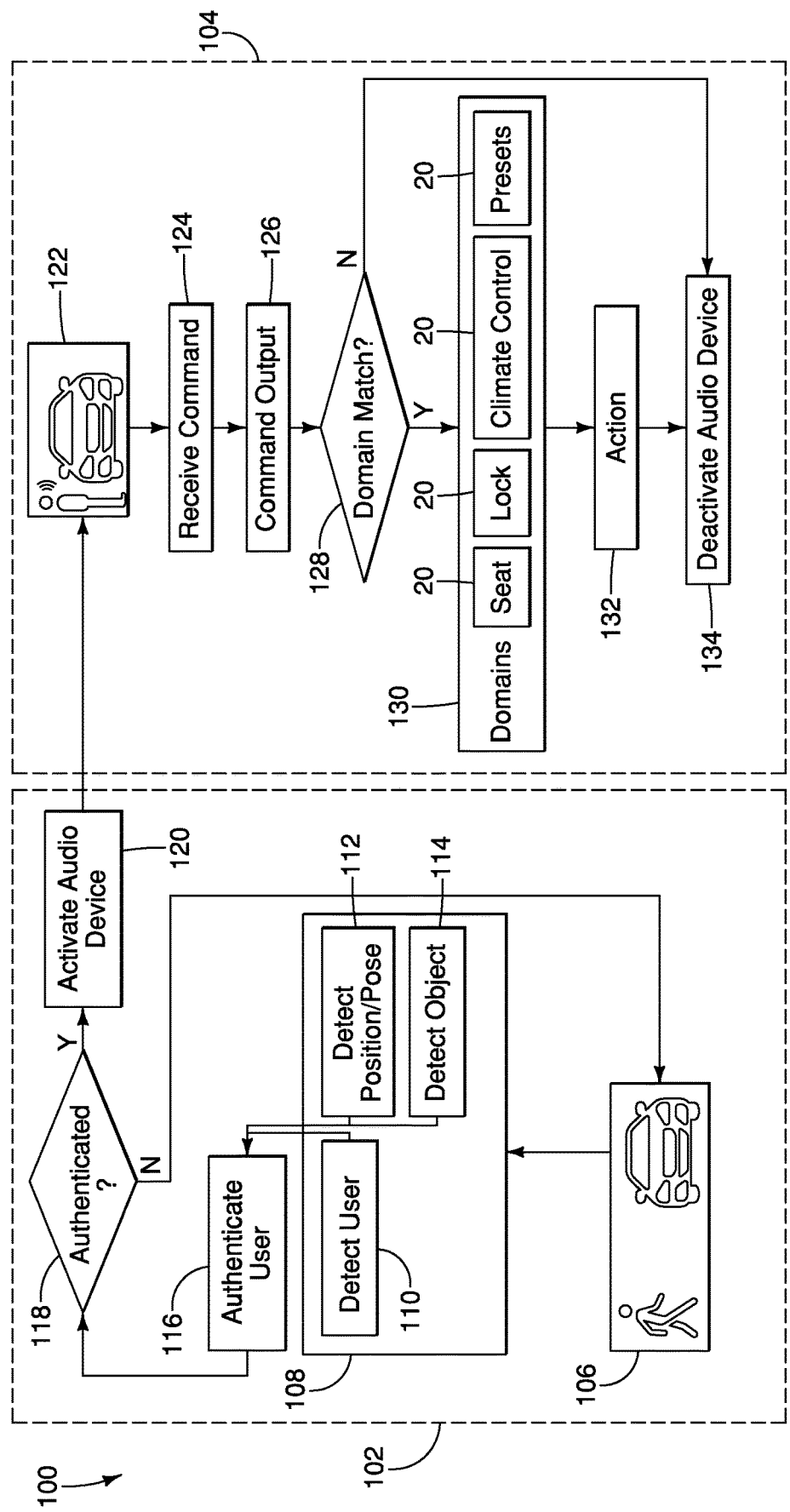
FIG. 2 illustrates an example embodiment of a method of adjusting one or more component of a vehicle in accordance with the present disclosure which can be implemented using the system of FIG. 1.

FIG. 2 illustrates an example embodiment of a method 100 of adjusting vehicle components based on audible commands. Some or all of the steps of the method 100 can be stored as instructions on at least one memory 19 of the controller 16 and executed by at least one processor 18 of the controller 16. Some or all of the steps of the method 100 can also be stored as instructions on a memory of one or more of an adjustable vehicle component 20, authentication device 22, audio device 24 and/or sensor 30 and executed by a processor of the adjustable vehicle component 20, authentication device 22, audio device 24 and/or sensor 30. It should be understood from this disclosure that some of the steps described herein can be reordered or omitted without departing from the spirit or scope of method 100.

In FIG. 2, the method 100 is illustrated as including an authentication process 102 and a command process 104. It should be understood by those of ordinary skill in the art from this disclosure that there are embodiments in which one of the authentication process 102 and the command process 104 is performed without the other of the authentication process 102 and the command process 104, and vice versa.

At step 106, a potential vehicle user approaches a vehicle 12. The potential vehicle user may or may not be an authorized user of the vehicle 12. In an embodiment, the authentication device 22 is actively attempting to identify potential vehicle users during step 106. In an embodiment, the audio device 24 is deactivated during step 106. In an embodiment, one or more vehicle component 20 is in a current configuration during step 106.

At step 108, the authorization device 22 detects the potential vehicle user located outside of the vehicle 12. In an embodiment, step 108 includes step 110 in which the authentication device 22 detects the potential vehicle user. In an embodiment, the authentication device 22 detects the potential vehicle user by detecting an authentication object held by the potential vehicle user. In an embodiment, the authentication device 22 detects the potential vehicle user via a sensor (e.g., a sensor 30) which detects a signal emitted by the authentication object. In an embodiment, the authentication device 22 detects the potential vehicle user when the potential vehicle user has approached close enough to be within an authentication distance of the vehicle 12.

In an embodiment, step 108 includes detecting the signal from a key fob located within an authentication distance of the vehicle 12. In this embodiment, the key fob is an authentication object held by the vehicle user. In an embodiment, the authentication device 22 does not detect the key fob until the key fob is located within the authentication distance of the vehicle 12. This ensures that the authorization process does not occur unless the potential vehicle user is within an approximate predetermined distance from the vehicle 12. In an embodiment, the authorization distance is about three meters.

In an embodiment, step 108 includes recording at least one image of a potential vehicle user located outside of the vehicle 12. In an embodiment, the controller 16 processes the image to generate authorization data relating to the potential vehicle user.

In an embodiment, step 108 includes step 112 in which the controller 16 detects a pose of the potential vehicle user and/or a position of the potential vehicle user with respect to the vehicle 12. In an embodiment, the controller 16 is configured to determine the pose by creating or modifying a point cloud comprising a plurality of points and/or vectors created from an image of the potential vehicle user. The controller 16 is configured to process the point cloud, for example using a neural network, to determine the pose of the potential vehicle user. In an embodiment, the controller 16 is configured to determine the position of the potential vehicle user with respect to the vehicle 12 by sensing the potential vehicle user with a proximity sensor and/or analyzing an image of the potential vehicle user.

In an embodiment, step 108 includes step 114 in which the controller detects an object held by the user. The object can be, for example, a child, a package or bag, or another object. In an embodiment, the controller 16 is configured to detect an object by creating or modifying a point cloud comprising a plurality of points and/or vectors created from an image of the potential vehicle user. The controller 16 is configured to process the point cloud, for example using a neural network, to identify the object or the existence of an object. In an embodiment, the controller 16 is configured to detect the object based on the size and/or shape of the object in the image and/or the relative positioning with respect to the potential vehicle user. In an embodiment, the controller 16 is configured to detect that the potential vehicle user is holding an object based on the pose of the potential vehicle user.

Upon detecting the potential vehicle user, the authorization device 22 generates authorization data corresponding to the potential vehicle user. In an embodiment, the authorization data includes data regarding an authentication object that has been detected. For example, the authorization data can include key fob data relating to the detected signal from a key fob. In an embodiment, the authorization data includes an image of the potential vehicle user. In an embodiment, the authorization data includes data which can be used for facial recognition, pose determination, positional determination, object determination, or another determination.

At step 116, the potential vehicle user is authenticated as an authorized vehicle user. Specifically, the controller 16 and/or authentication device 22 processes the authentication data generated at step 108. For example, key fob data can be processed to determine that the key fob corresponds to the vehicle 12, and the potential vehicle user can be authenticated as an authorized vehicle user due to the authorized key fob being located within the authorization distance of the vehicle 12. In an embodiment, step 116 includes processing an image of the potential vehicle user. In an embodiment, the image is processed for facial recognition, pose determination, positional determination, object determination, or another determination for authorization purposes, for example using a neural network.

At step 118, if the detected potential vehicle user has not been authenticated, the method 100 returns to step 106 and continues to attempt to detect other potential users of the vehicle 12. If the detected potential vehicle user has been authenticated, the method 100 proceeds to step 120.

At step 120, the controller 16 activates the audio device 24. Specifically, the controller 16 activates the audio device 24 for reception of an audible command from the authorized vehicle user. In an embodiment, the controller activates the microphone 26 of the audio device 24. In an embodiment, the microphone 26 is configured to record noise from outside of the vehicle 12 once activated. Specifically, the microphone 24 is configured to receive audible commands from the authorized vehicle user from outside of the vehicle 12 once activated. In an embodiment, the audio device 24 does not record noise from outside of the vehicle 12 when deactivated. This prevents the audio device 24 from receiving audible commands from unauthorized persons when the authorized vehicle user is not in the vicinity.

In an alternative embodiment, the audio device 24 is active and is used in combination with the authorization device 22 during one or more of steps 106 to 118. For example, in an embodiment, the authorization device 22 is configured to use voice recognition to authenticate an authorized vehicle user. The voice recognition can be performed based on authentication data recorded from an audible sentence spoken by the vehicle user to the audio device 24. In an embodiment, the authentication process 102 may require both detection of an authentication object and voice recognition by the audio device 24.

At step 122, the authorized vehicle user speaks an audible command. The audible command includes an instruction to adjust an adjustable vehicle component 20. For example, the audible command can include "Move the driver's seat" or "Unlock the doors" or "Adjust the temperature." Those of ordinary skill in the art will recognize from this disclosure that there are various alternative audible commands that can be used to cause adjustment to adjustable vehicle components 20 according to the present disclosure.

In an embodiment, the audible command includes a trigger word or phrase. For example, the trigger word or phrase can include "Hey Nissan" or another phrase as if the authorized vehicle user is speaking to the vehicle 12. When the controller 16 processes the speech received by the audio device 24, the controller 16 then determines that the audible command includes the words or phrase that follow the trigger word or phrase. In an embodiment, the audio device 24 is activated after receiving the trigger word or phrase. In an embodiment, the audio device 24 must be activated twice: a first activation occurs at step 120 when the potential vehicle user is authenticated as an authorized vehicle user, and a second activation occurs at step 122 when the authorized vehicle user speaks the trigger word or phrase.

In an alternative embodiment, for example when the command process 104 is performed without the authentication process 102, the trigger word or phrase can serve as the authorization. For example, the trigger word or phrase can be a password known only to the authorized vehicle user.

In another alternative embodiment, for example when the command process 104 is performed without the authentication process 102, the potential vehicle user's voice can provide authorization. For example, system 10 can be configured perform voice recognition and use the voice recognition to authorize the vehicle user. In an embodiment, the system 10 is configured to authorize the user by confirming that the user's voice is recognized and the user spoke the correct trigger word or phrase.

In an embodiment, multiple vehicle occupants can provide audible commands once a single occupant is authorized as an authorized vehicle user. For example, both occupants can speak audible commands to request that their respective doors be opened. In an embodiment, an authorized vehicle user must speak an audible trigger phrase for the audible commands of a second occupant to be processed in accordance with the method 100. In an embodiment, one or more sensor 30 can detect multiple occupants within a command distance of the vehicle and accept audible commands from occupants within the command distance once a single occupant is authorized.

At step 124, the audio device 24 receives the audible command. Specifically, the audio device 24 receives the audible command from the authorized vehicle user while the authorized vehicle user is located outside of the vehicle 12. More specifically, the microphone 26 of the audio device 24 receives the audible command. The audible command includes an instruction from the authorized vehicle user to adjust at least one adjustable vehicle component 20. The audio device 24 generates command data corresponding to the audio command.

At step 126, the controller 16 processes a command output. In an embodiment, the controller 16 generates the command output based on the command data. In an embodiment, the command output includes an NLU output corresponding to the audible command received by the audio device 24 at step 124. The NLU output can be generated at the audio device 24 and included in the command data. Alternatively, the NLU output can be generated by the controller 16 using the command data. In another embodiment, the command output includes an ASR output corresponding to the audible command received by the audio device 24 at step 124. The ASR output can be generated at the audio device 24 and included in the command data. Alternatively, the ASR output can be generated by the controller 16 using the command data.

At step 128, the controller 16 correlates the command data with an adjustable vehicle component 20 of a plurality of adjustable vehicle components 20. In an embodiment, the correlation is a domain matching process. In an embodiment, the controller 16 correlates the command output with an adjustable vehicle component 20 of a plurality of adjustable vehicle components 20. For example, the controller 16 determines whether one or more word of the command output matches at least one adjustable vehicle component 20. If the controller 16 cannot correlate the command data with an adjustable vehicle component 20 at step 128, the method 100 proceeds to step 134.

In an embodiment, the controller 16 processes the command data to determine whether a threshold has been met. More specifically, the controller 16 determines whether the threshold has been met by the command output. In an embodiment, the threshold is met when the controller 16 recognizes at least one word from the command output. In an embodiment, the threshold is met when the controller 16 recognizes at least one word from the command output which corresponds to a predetermined group of words. In another embodiment, the threshold is met when the controller 16 recognizes a predetermined number of a plurality of words of the command output (e.g., from a predetermined group of words). In an embodiment, the controller 16 is configured to generate at least one confidence score based on the command output. In an embodiment, the confidence score is based on a number of recognized words in the command output. In an embodiment, the confidence score is based on a type of recognized word in the command output. In an embodiment, the confidence score is based on missing words in the command output. In an embodiment, the confidence score includes a first numerical value and the threshold includes a second numerical value, and the controller 16 is configured to determine that the threshold has been met if the first numerical value is above or below the second numerical value. In an embodiment, the confidence score is generated based on the controller 16 recognizing one or more word from the command output (e.g., from a predetermined group of words). In an embodiment, the confidence score is generated based on the controller 16 recognizing particular words or a particular order of words. In an embodiment, the confidence score includes an error probability determination. In an embodiment, the threshold is met if the confidence score is within a standard deviation of the threshold (e.g., one standard deviation as determined by user studies).

At step 130, the controller 16 has correlated the command data with at least one adjustable vehicle component 20. For example, the controller 16 has determined correspondence based on recognized words and/or a confidence score meeting a threshold. The controller 16 then generates instructions to adjust the correlated adjustable vehicle component 20. Here, the adjustable vehicle components 20 shown include a seat, a lock, a climate control system and another preset, but those of ordinary skill in the art will recognize from this disclosure that there are various other adjustable vehicle components which would be advantageous to have adjusted in accordance with the systems and methods discussed herein.

In an embodiment, the controller 16 determines the adjustment to the correlated adjustable vehicle component 20 based on the state of the adjustable vehicle component 20. For example, if the correlated adjustable vehicle component 20 is locked in its current configuration, the controller 16 determines that the adjustment is to unlock the lock. In another example, if the correlated adjustable vehicle component 20 is turned off in its current configuration, the controller 16 determines that the adjustment is to turn the component on. In an embodiment, the controller 16 uses the command output from step 126 to determine the correlated adjustable vehicle component 20. For example, if the command output indicates a preset configuration (e.g., "Move the driver's seat to preset 1"), then the controller 16 determines that the adjustment is cause the preset configuration (e.g., preset 1).

At step 132, the controller 16 causes the adjustment of at least one adjustable vehicle component 20. Specifically, the controller 16 causes the adjustment of at least one adjustable vehicle component 20 in response to the audible command. The adjustment can include at least one of a mechanical adjustment, a volume level adjustment, a temperature adjustment, a route adjustment, or any other adjustment caused by instructions generated by the controller 16. The controller 16 is configured to cause adjustment to the at least one adjustable vehicle component 20 by directly controlling the at least one adjustable vehicle component 20 and/or by sending instructions to a separate controller of the at least one adjustable vehicle component 20.

In an embodiment, the adjustment is to change the configuration of a vehicle seat from a current configuration to a new configuration. The new configuration can be a preset configuration (e.g., a preset configuration for the authorized vehicle user). This embodiment is particularly advantageous for large vehicle users who have a difficult time adjusting their seat while sitting in the vehicle 12. In an embodiment, the controller 16 can use voice recognition of the audible command to determine the preset configuration (e.g., adjust the driver's seat to a preset position for the user voicing the audible command).

In an embodiment, the adjustment is to unlock a door or trunk. This embodiment is particularly advantageous when an authorized vehicle user has his or her hands full. In an embodiment, the controller 16 can use sensor data and/or an image of the authorized vehicle user to determine that the authorized vehicle user has his or her hands full.

In an embodiment, the adjustment is to adjust a temperature of a climate control system. This embodiment is particularly advantageous for cooling the vehicle 12 on a warm day or warming the vehicle 12 on a cold day prior to the authorized vehicle user entering the vehicle 12.

In an embodiment, the controller 16 is configured to detect a position of the authorized vehicle user with respect to the vehicle 12 and adjust at least one adjustable vehicle component 20 based on the position of the authorized vehicle user. For example, if the command is to unlock a door, the controller 16 can use sensor data from at least one sensor 30 to determine the door closest to the authorized vehicle user and cause that door to be unlocked. In an embodiment, the controller 16 can use sensor data from at least one sensor 30 to determine that an authorized vehicle user is located at the trunk of the vehicle 12 and cause the trunk to be unlocked and/or opened.

At step 134, the controller 16 deactivates the audio device 24. Specifically, the controller 16 deactivates the audio device 24 after adjusting the at least one adjustable vehicle component 20. By deactivating the audio device 24 after adjusting the at least one adjustable vehicle component 20, the system 10 ensures that false commands are not thereafter received by the audio device 24. In an embodiment, the controller 16 deactivates the audio device 24 once the authorized vehicle user has opened and closed a door. Specifically, in an embodiment, the controller 16 deactivates the audio device 24 once the authorized vehicle user has opened and closed the driver's side door. This way, the system can be certain that the authorized vehicle user no longer wishes to make audible commands from outside of the vehicle 12.

FIG. 3 illustrates an example embodiment of the method of FIG. 2. In the illustrated embodiment, the authentication device 22 is configured to detect the vehicle user when the vehicle user is within an authentication distance D1 of the vehicle 12 (e.g., about 3 meters). The audio device 24 is then configured to receive an audible command from the vehicle user when the vehicle user is within a command distance D2 of the vehicle 12 (e.g., about 0.5 meters). The command distance D2 is smaller than the authentication distance D1. This way, the authentication process 102 is performed as the vehicle user approaches the vehicle 12, and the audio device 24 is activated by the time the vehicle user is within the command distance D2 so that the command process 104 can be performed.

In an embodiment, the method 100 includes processing an image of a potential or authorized vehicle user. The image can be used in the authentication process 102 and/or the command process 104. The image is of a potential or authorized vehicle user while the vehicle user is located outside of the vehicle 12. The image can include still images or video.

In an embodiment, the image is used in the authentication process 102. In an embodiment, the potential vehicle user is authenticated based on the image. For example, the potential vehicle user can be authenticated based on facial recognition using the image. In another example, the potential vehicle user can be authenticated based on size or shape recognition using the image. In another example, the potential vehicle user can be authenticated based on the potential vehicle user's pose or position within the image.

In an embodiment, the image is used in the command process 104. In an embodiment, the controller 16 adjusts at least one adjustable vehicle component 20 based on the at least one image. More specifically, the controller 16 adjusts at least one adjustable vehicle component 20 based on the at least one image upon authenticating an authorized vehicle user.

In an embodiment, the controller 16 is configured to detect a pose of the authorized vehicle user in the at least one image and adjust at least one adjustable vehicle component 20 based on the pose. In an embodiment, the controller 16 is configured to determine the pose by creating or modifying a point cloud comprising a plurality of points and/or vectors created from the image. The controller 16 is configured to process the point cloud, for example using a neural network, to determine the pose.

In an embodiment, the controller 16 is configured to detect an object in the at least one image and adjust at least one adjustable vehicle component 20 based on the object. The object can be an object carried by the vehicle user, for example, a child or package. The controller 16 can detect the object, for example, using size and/or shape recognition. The controller 16 can also detect the object by first determining the vehicle user's pose to be an object-holding pose and then determining the object's relative positioning with respect to the vehicle user. In an embodiment, the controller 16 can move a vehicle seat forward and/or adjust a child seat upon detecting a child in an authorized vehicle user's arms. In an embodiment, the controller 16 can unlock and/or open the trunk or back seat upon determining that an authorized vehicle user has his or her hands full.

In an alternative embodiment, an electronic device such as a smart phone can include the audio device 24. This way, audible commands can be provided by an authorized vehicle user while away from the vehicle 12 (e.g., to adjust temperature within the vehicle 12 a few minutes before ingress). In this embodiment, the electronic device is configured to perform the authorization process 102, for example, by requiring a password, fingerprint, facial recognition, or another security procedure used by the electronic device.

In an embodiment in which an electronic device such as a smart phone can include the audio device 24, the controller 16 is configured to authenticate the vehicle user when the electronic device is located within an authentication distance of the vehicle 12. This determination can be made, for example, using the electronic device's GPS or another technology such as Bluetooth. This feature enables the authorized vehicle user to adjust vehicle components, for example, when the vehicle user is inside his or her home and the vehicle is parked outside.

In another embodiment, the audio device 24 is configured to collect noise level data relating to the vehicle 12 or its surroundings. In this embodiment, the noise level data can be used to model wind noise dampening features for future vehicles 12 and/or provide city level noise data that can be monetized through smart city initiatives.

The systems and methods described herein are advantageous for enabling an authorized vehicle user to make adjustments within a vehicle 12 before entering the vehicle 12. For example, the systems and methods described herein are advantageous for enabling an authorized vehicle user to make adjustments to the vehicle 12 when his or her hands are full, and for enabling a large user's to adjust seat position before entering the vehicle 12. It should be understood that various changes and modifications to the methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle 12 equipped as disclosed herein. Accordingly, these terms, as utilized to describe the present invention should be interpreted relative to a vehicle 12 equipped as shown herein.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for adjusting one or more component of a vehicle, the system comprising:
   at least one adjustable vehicle component;
   an authentication device configured to detect a key fob held by a vehicle user outside of the vehicle within an authentication distance of the vehicle;
   an audio device configured to receive an audible command from the vehicle user from outside of the vehicle and generate corresponding command data; and
   a controller programmed to (i) detect the key fob being located within the authentication distance of the vehicle; (ii) after detection of the key fob, process speech received via the audio device from the vehicle user from outside the vehicle and confirm that the speech included a trigger word or phrase, (iii) after confirming that the speech included the trigger word or phrase, activate the audio device for reception of audible commands and generation of the corresponding command data; (iv) cause an adjustment of the at least one adjustable vehicle component based on the command data, and (v) deactivate the audio device for reception of the audible commands upon determining that the vehicle user has opened and closed at least a driver side door of the vehicle.

2. The system of claim 1, further comprising
a plurality of adjustable vehicle components each configured to be adjusted in response to at least one audible command,
the controller programmed to correlate the command data with an adjustable vehicle component of the plurality of adjustable vehicle components and cause the adjustment to the correlated adjustable vehicle component.

3. The system of claim 1, wherein
the authentication device further includes a camera configured to record at least one image of the vehicle user.

4. The system of claim 1, wherein
the at least one audio device is located on an exterior of the vehicle.

5. The system of claim 1, wherein
the at least one adjustable vehicle component includes a vehicle seat, and
the controller causes the adjustment by moving the vehicle seat to a different configuration.

6. The system of claim 1, wherein
upon confirming that the speech included the trigger word or phrase from a first vehicle user, the controller is configured to activate the audio device for reception of the audible commands from both the first vehicle user and a second vehicle user.

7. The system of claim 1, wherein
the controller is configured to use one or more vehicle sensors to detect multiple vehicle users within a command distance of vehicle and activate the audio device for reception of audible commands from the multiple vehicle users upon a single vehicle user being authorized by use of the trigger word or phrase.

8. A method of adjusting one or more component of a vehicle, the method comprising:
   detecting a key fob held by a vehicle user located outside of the vehicle and within an authentication distance of the vehicle;
   after detecting the key fob held by the vehicle user, processing speech received via the audio device from the vehicle user from outside the vehicle and confirming that the speech included a trigger word or phrase;
   after confirming that the speech included the trigger word or phrase, activating the audio device for reception of audible commands from the vehicle user;
   receiving at least one audible command from the vehicle user while the vehicle user is located outside of the vehicle;
   adjusting at least one adjustable vehicle component in response to the at least one audible command; and
   deactivating the audio device for reception of the audible commands upon determining that the vehicle user has opened and closed at least a driver side door of the vehicle.

9. The method of claim 8, comprising
processing an image of the vehicle user to further authenticate the vehicle user.

10. The method of claim 8, comprising
detecting a position of the vehicle user with respect to the vehicle.

11. The method of claim 8, wherein
adjusting the at least one adjustable vehicle component includes moving a vehicle seat to a different configuration.

12. The method of claim 8, wherein p1 adjusting the at least one adjustable vehicle component includes adjusting a temperature setting within the vehicle.

13. The method of claim 8, comprising
upon confirming that the speech included the trigger word or phrase from a first vehicle user, activating the audio device for reception of the audible commands from both the first vehicle user and a second vehicle user.

14. The method of claim 8, comprising
detecting multiple vehicle users within a command distance of the vehicle, and
activating the audio device for reception of the audible commands from the multiple vehicle users once a single vehicle user is authorized by use the trigger word or phrase.

15. A method of adjusting one or more component of a vehicle, the method comprising:
detecting a key fob held by a potential vehicle user located outside of the vehicle and within an authentication distance of the vehicle;
after detecting the key fob held by the potential vehicle user, recording at least one image of the potential vehicle user located outside of the vehicle;
authenticating the potential vehicle user as an authorized vehicle user using the at least one image;
after authenticating the authorized vehicle user using the at least one image, activating an audio device for reception of an audible command from the authorized vehicle user;
adjusting at least one adjustable vehicle component based on the audible command; and
deactivating the audio device for reception of additional audible commands upon determining that the vehicle user has opened and closed at least a driver side door of the vehicle.

16. The method of claim 15, comprising
detecting an object in the at least one image, and
adjusting the at least one adjustable vehicle component based on the object.

17. The method of claim 15, comprising
detecting a position of the authorized vehicle user with respect to the vehicle, and
adjusting the at least one adjustable vehicle component based on the position of the authorized vehicle user.

18. The method of claim 15, comprising
detecting a pose of the authorized vehicle user in the at least one image, and
adjusting the at least one adjustable vehicle component based on the pose.

19. A system including a controller programmed to perform the method of claim 15.

20. The method of claim 15, comprising
after detecting the key fob held by the potential vehicle user, processing speech received via the audio device from outside the vehicle and confirming that the speech included a trigger word or phrase,
after confirming that the speech included the trigger word or phrase, activating the audio device for reception of audible commands from multiple vehicle users.

* * * * *